(12) United States Patent
Jiang et al.

(10) Patent No.: US 7,127,648 B2
(45) Date of Patent: Oct. 24, 2006

(54) SYSTEM AND METHOD FOR PERFORMING ON-CHIP SELF-TESTING

(75) Inventors: Hongtao Jiang, Anaheim, CA (US); Tuan Hoang, Westminster, CA (US)

(73) Assignee: Broadcom Corporation, Irvine, CA (US)

( * ) Notice: Subject to any disclaimer, the term of this patent is extended or adjusted under 35 U.S.C. 154(b) by 400 days.

(21) Appl. No.: 10/266,286

(22) Filed: Oct. 8, 2002

(65) Prior Publication Data
US 2004/0030977 A1    Feb. 12, 2004

Related U.S. Application Data

(60) Provisional application No. 60/401,872, filed on Aug. 7, 2002.

(51) Int. Cl.
*G01R 31/28* (2006.01)
*G06F 11/00* (2006.01)

(52) U.S. Cl. .......... 714/715; 714/716; 714/742

(58) Field of Classification Search .......... 714/43, 714/712, 715, 716, 824, 732–736, 738
See application file for complete search history.

(56) References Cited

U.S. PATENT DOCUMENTS

| | | | |
|---|---|---|---|
| 5,455,832 A * | 10/1995 | Bowmaster | 714/712 |
| 6,260,167 B1 * | 7/2001 | Lo et al. | 714/744 |
| 2002/0056060 A1 * | 5/2002 | Saruhashi et al. | 714/712 |
| 2002/0059545 A1 * | 5/2002 | Nakashima et al. | 714/43 |
| 2003/0035473 A1 * | 2/2003 | Takinosawa | 375/224 |
| 2004/0017780 A1 * | 1/2004 | Tazebay et al. | 370/248 |

* cited by examiner

*Primary Examiner*—Albert Decady
*Assistant Examiner*—John J. Tabone, Jr.
(74) *Attorney, Agent, or Firm*—McAndrews, Held & Malloy, Ltd.

(57) ABSTRACT

A method for determining whether a physical layer device under test is defective may include establishing a closed communication path between a verified physical layer device and the physical layer device under test via an optical interface of the verified physical layer device and an optical interface of the physical layer device under test. Alternately, the electrical interface may also be used for testing. A packet generator may transmit test packets over the established closed communication path and at least a portion of the test packets from the physical layer device under test may be received by the verified physical layer device. Subsequently, the verified physical layer device may compare at least a portion of the received test packets with at least a portion of the generated test packets in order to determine whether the physical layer device is defective or operational.

48 Claims, 7 Drawing Sheets

SYSTEM AND METHOD FOR PERFORMING ON-CHIP SELF-TESTING

CROSS-REFERENCE TO RELATED APPLICATIONS/INCORPORATION BY REFERENCE

This application makes reference to, claims priority to and claims the benefit of U.S. Provisional Patent Application Ser. No. 60/401,872 filed on Aug. 7, 2002.

This application also makes reference to U.S. Pat. No. 6,424,194, U.S. application Ser. No. 09/540,243 filed on Mar. 31, 2000, U.S. Pat. No. 6,389,092, U.S. Pat. No. 6,340,899, U.S. application Ser. No. 09/919,636 filed on Jul. 31, 2001, U.S. application Ser. No. 09/860,284 filed on May 18, 2001, U.S. application Ser. No. 10/028,806 filed on Oct. 25, 2001, U.S. application Ser. No. 09/969,837 filed on Oct. 1, 2001, U.S. application Ser. No. 10/159,788 entitled "Phase Adjustment in High Speed CDR Using Current DAC" filed on May 30, 2002, U.S. application Ser. No. 10/179,735 entitled "Universal Single-Ended Parallel Bus; fka, Using 1.8V Power Supply in 0.13 MM CMOS" filed on Jun. 21, 2002, and U.S. application Ser. No. 60/402,097 entitled "SYSTEM AND METHOD FOR IMPLEMENTING A SINGLE-CHIP HAVING A MULTIPLE SUB-LAYER PHY" filed on Aug. 7, 2002.

All of the above stated applications are incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Embodiments of the present application relate generally to optical networking hardware, and more particularly to a system and method for performing self-testing on a physical layer multimode device.

High-speed digital communication networks over copper and optical fiber are used in many network communication and digital storage applications. Ethernet and Fiber Channel are two widely used communication protocols which continue to evolve in response to increasing need for higher bandwidth in digital communication systems.

The Open Systems Interconnection (OSI) model (ISO standard) was developed to establish standardization for linking heterogeneous computer and communication systems. It describes the flow of information from a software application of a first computer system to a software application of a second computer system through a network medium. The OSI model has seven distinct functional layers including Layer 7: an application layer; Layer 6: a presentation layer; Layer 5: a session layer; Layer 4: a transport layer; Layer 3: a network layer; Layer 2: a data link layer; and Layer 1: a physical layer. Importantly, each OSI layer describes certain tasks which are necessary for facilitating the transfer of information through interfacing layers and ultimately through the network. Notwithstanding, the OSI model does not describe any particular implementation of the various layers.

OSI layers 1 to 4 generally handle network control and data transmission and reception. Layers 5 to 7 handle application issues. Specific functions of each layer may vary depending on factors such as protocol and interface requirements or specifications that are necessary for implementation of a particular layer. For example, the Ethernet protocol may provide collision detection and carrier sensing in the data link layer.

Layer 1, the physical layer, is responsible for handling all electrical, optical, opto-electrical and mechanical requirements for interfacing to the communication media. Notably, the physical layer may facilitate the transfer of electrical signals representing an information bitstream. The physical layer may also provide services such as, encoding, decoding, synchronization, clock data recovery, and transmission and reception of bit streams. In high bandwidth applications having transmission speeds of the order of Gigabits, high-speed electrical, optical and/or electro-optical transceivers may be used to implement this layer.

As the demand for higher data rates and bandwidth requirements continues to increase, transmission rates of the order of 10 Gigabits and higher is being developed for high-speed network applications. Accordingly, there is a need to develop a 10 Gigabit physical layer device that may facilitate such high-speed serial data applications. For example, XENPAK multi-source agreement (MSA) defines a fiber optical module that conforms to the well-known IEEE standard for 10 Gigabit Ethernet (GbE) physical media dependent (PMD) types. In this regard, XENPAK compatible transceivers may be used implement the physical layer. Notwithstanding, there is a need for transceivers, which are necessary for 10 Gigabit physical layer applications. The well-known IEEE P802.3ae draft 5 specifications describes the physical layer requirements for 10 Gigabit Ethernet applications and is incorporated herein by reference in its entirety.

An optical-based transceiver, for example, may include various functional components such as clock data recovery, clock multiplication, serialization/deserialization, encoding/decoding, electrical/optical conversion, descrambling, media access control (MAC), controlling, and data storage. These functional components may be implemented in a separate chip or and integrated circuit (IC).

The proliferation of physical layer devices designed to meet the needs of high speed communication will, without a doubt, give rise to the need for testing these devices. The testing of ICs or chips may often involve the application of one or more test signals to the inputs of the chip and capturing the output signals by an external device. The external device may typically store and compare the captured outputs against expected outputs that are known to be accurate. In this regard, defective chips may be detected when the captured output signals are inconsistent with the expected outputs.

Testing a chip by applying input signals and capturing of outputs by an external device may become difficult as the data rate of the chip increases. To simulate operational conditions, the external device must apply the input signals and capture the outputs at the operational data rate of the chip. Testing optical transceivers may be challenging because of the high speeds at which these devices operate. Accordingly, a need exists for testing physical layer multimode devices that may operate at speeds of the order of about 10 Gbps.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

The invention provides a method and system for performing on-chip self-testing for a 10 Gigabit multimode physical layer device. In one aspect of the invention, a method for determining whether a physical layer device under test is defective is provided. The method may include establishing a closed communication path between a verified physical layer device and the physical layer device under test via an optical interface of the verified physical layer device and an optical interface of the physical layer device under test. Test packets may then be generated for communication over the established closed communication path and at least a portion of the test packets from the physical layer device under test may be received by the verified physical layer device. Subsequently, the verified physical layer device may compare at least a portion of the received test packets with at least a portion of the generated test packets in order to determine whether the physical layer device is defective. The verified physical layer device and the physical layer device under test may be initialized to operate in one of a 10 Gigabit Ethernet mode or a fibre channel mode, or any combination thereof.

In accordance with one aspect of the invention, the step of establishing a closed communication path may further include the step of connecting an optical output of the verified physical layer device to an optical input of the physical layer device under test. This may include connecting an optical transmit path of the verified physical layer device to an optical receive path of the physical layer device under test. Additionally, an optical receive path of the verified physical layer device may be connected to an optical transmit path of the physical layer device under test. The physical layer device under test may be configured to operate in loopback mode. The configuration step may further include the step of connecting an electrical receive path of the physical layer device under test to an electrical transmit path of the physical layer device under test. Subsequent to establishing the closed communication path, the generating step may further include the step of transmitting the generated test packets from the verified physical layer device over the closed communication path to the physical layer device under test.

During the comparing step, if at least a selected portion of the received test packets are not equivalent to a corresponding selected portion of the generated test packets, the physical layer device under test may be identified as being defective. Additionally, if at least a selected portion of the received test packets is equivalent to a corresponding selected portion of the generated test packets, then the physical layer device under test may be identified as being operational.

In another aspect of the invention, a method for determining whether a physical layer device under test is defective is provided. The method may include the step of establishing a closed communication path between a verified physical layer device and the physical layer device under test via an electrical interface of the verified physical layer device and an electrical interface of the physical layer device under test. Test packets may subsequently be generated for communication over the established closed communication path. At least a portion of the test packets may be received from the physical layer device under test. Additionally, at least a portion of the received test packets may be compared with at least a portion of the generated test packets in order to determine whether the physical layer device is defective. The verified physical layer device and the physical layer device under test may be initialized to operate in one of a 10 Gigabit Ethernet mode or a fibre channel mode, or any combination thereof.

The step of establishing the closed communication path may further include the step of connecting an electrical output of the verified physical layer device to an electrical input of the physical layer device under test. The connecting step may further include the step of connecting an electrical transmit path of the verified physical layer device to an electrical receive path of the physical layer device under test. Additionally, an electrical receive path of the verified physical layer device may be connected to an electrical transmit path of the physical layer device under test. The physical layer device under test may be configured to operate in loopback mode. This may include connecting an optical receive path of the physical layer device under test to an optical transmit path of the physical layer device under test. Subsequent to establishing the closed communication path, the generating step may further include the step of transmitting the generated test packets from the verified physical layer device over the closed communication path to the physical layer device under test.

During the comparing step, if at least a selected portion of the received test packets are not equivalent to a corresponding selected portion of the generated test packets, the physical layer device under test may be identified as being defective. Additionally, if at least a selected portion of the received test packets is equivalent to a corresponding selected portion of the generated test packets the physical layer device under test may be identified as being operational. The verified physical layer device and the physical layer device under test may be initialized to operate in one of a 10 Gigabit Ethernet mode or a fibre channel mode, or any combination thereof.

A further aspect of the invention provides a system for determining whether a physical layer device under test is defective. The system may include means for establishing a closed communication path between a verified physical layer device and the physical layer device under test via an optical interface of the verified physical layer device and an optical interface of the physical layer device under test. Means for generating test packets for communication over the established the closed communication path and means for receiving at least a portion of the test packets from the physical layer device under test may also be provided. In order to determine whether the physical layer device is defective, means for comparing at least a portion of the received test packets with at least a portion of the generated test packets may also me provided.

In accordance with one aspect of the invention, the means for establishing the closed communication path may further include means for connecting an optical output of the verified physical layer device to an optical input of the physical layer device under test. The connecting means may further include means for connecting an optical transmit path of the verified physical layer device to an optical receive path of the physical layer device under test. Additionally, the connecting means may also include means for connecting an optical receive path of the verified physical layer device to an optical transmit path of the physical layer device under test. The physical layer device under test may be configured to operate in loopback mode.

The configuring means may further include means for connecting an electrical receive path of the physical layer device under test to an electrical transmit path of the physical layer device under test. The generating means may further include means for transmitting the generated test packets from the verified physical layer device over the closed communication path to the physical layer device under test.

The comparing means may further include means for identifying the physical layer device under test as defective if at least a selected portion of the received test packets are not equivalent to a corresponding selected portion of the generated test packets. Additionally, the comparing means may further include means for identifying the physical layer device under test as operational if at least a selected portion of the received test packets is equivalent to a corresponding selected portion of the generated test packets.

In yet a further aspect of the invention, a system for determining whether a physical layer device under test is defective is provided. The system may include means for establishing a closed communication path between a verified physical layer device and the physical layer device under test via an electrical interface of the verified physical layer device and an electrical interface of the physical layer device under test. Means for generating test packets for communication over the established closed communication path and means for receiving at least a portion of the test packets from the physical layer device under test may also be included. In order to determine whether the physical layer device is defective, means for comparing at least a portion of the received test packets with at least a portion of the generated test packets may be provided. The verified physical layer device and the physical layer device under test may be initialized to operate in one of a 10 Gigabit Ethernet mode or a fibre channel mode, or any combination thereof.

The means for establishing the closed communication path may further include for connecting an electrical output of the verified physical layer device to an electrical input of the physical layer device under test. The connecting means may further include means for connecting an electrical transmit path of the verified physical layer device to an electrical receive path of the physical layer device under test. Additionally, means for connecting an electrical receive path of the verified physical layer device to an electrical transmit path of the physical layer device under test may also be provided. The physical layer device under test may be configured to operate in loopback mode. The configuring means may further include means for connecting an optical receive path of the physical layer device under test to an optical transmit path of the physical layer device under test. The generating means may further include means for transmitting the generated test packets from the verified physical layer device over the closed communication path to the physical layer device under test.

The comparing means may further include means for identifying the physical layer device under test as defective if at least a selected portion of the received test packets are not equivalent to a corresponding selected portion of the generated test packets. Finally, the comparing means may further include means for identifying the physical layer device under test as operational if at least a selected portion of the received test packets is equivalent to a corresponding selected portion of the generated test packets.

In yet a further aspect of the invention, a system for determining whether a physical layer device under test is defective is also provided. The system may include a connector for establishing a closed communication path between a verified physical layer device and the physical layer device under test via an optical interface of the verified physical layer device and an optical interface of the physical layer device under test. A packet generator may be configured to generate test packets for communication over the established closed communication path and a receiver may be configured to receive at least a portion of the test packets from the physical layer device under test. In order to determine whether the physical layer device is defective, a packet checker may compare at least a portion of the received test packets with at least a portion of the generated test packets. The verified physical layer device and the physical layer device under test may be initialized to operate in one of a 10 Gigabit Ethernet mode or a fibre channel mode, or any combination thereof.

The connector may further include an output port for connecting an optical output of the verified physical layer device to an optical input port of the physical layer device under test. Additionally, the connector may further include a connector for connecting an optical transmit path of the verified physical layer device to an optical receive path of the physical layer device under test. The connector may also include a connector that may facilitate connecting an optical receive path of the verified physical layer device to an optical transmit path of the physical layer device under test.

The physical layer device under test may be configured to operate in loopback mode. The configuration device may further include a connector that may connect an electrical receive path of the physical layer device under test to an electrical transmit path of the physical layer device under test. The packet generator may also include a transmitter, which may be configured to transmit the generated test packets from the verified physical layer device over the closed communication path to the physical layer device under test. The packet checker may further include a processor that may be configured to identify the physical layer device under test as defective if at least a selected portion of the received test packets are not equivalent to a corresponding selected portion of the generated test packets. Additionally, the processor may also be configured to identify the physical layer device under test as operational if at least a selected portion of the received test packets is equivalent to a corresponding selected portion of the generated test packets.

In yet still a further aspect of the invention, a system for determining whether a physical layer device under test is defective is also provided. The system may include a connector for establishing a closed communication path between a verified physical layer device and the physical layer device under test via an electrical interface of the verified physical layer device and an electrical interface of the physical layer device under test. A packet generator may be included for generating test packets for communication over the established closed communication path. A receiver in the system may be configured to receive at least a portion of the test packets from the physical layer device under test. In order to determine whether the physical layer device is defective, a packet checker for comparing at least a portion of the received test packets with at least a portion of the generated test packets. The verified physical layer device and the physical layer device under test may be initialized to operate in one of a 10 Gigabit Ethernet mode or a fibre channel mode, or any combination thereof.

The connector may further include an output port for connecting an electrical output of the verified physical layer device to an electrical input of port the physical layer device under test. In this regard, the connector may further include a connecting device for connecting an electrical transmit path of the verified physical layer device to an electrical receive path of the physical layer device under test. Additionally, the connector may also include a connecting device for connecting an electrical receive path of the verified physical layer device to an electrical transmit path of the physical layer device under test.

The physical layer device under test may be configured to operate in loopback mode. In this regard, the configuration device may further include a connector for connecting an optical receive path of the physical layer device under test to an optical transmit path of the physical layer device under test.

The packet generator may further include a transmitter that may be configured for transmitting the generated test packets from the verified physical layer device over the closed communication path to the physical layer device under test. The packet checker may further include a processor which may be configured for identifying the physical layer device under test as defective if at least a selected portion of the received test packets are not equivalent to a corresponding selected portion of the generated test packets. The processor may also be configured to identify the physical layer device under test as operational if at least a selected portion of the received test packets is equivalent to a corresponding selected portion of the generated test packets.

These and other advantages, aspects and novel features of the present invention, as well as details of an illustrated embodiment thereof, will be more fully understood from the following description and drawings.

DETAILED DESCRIPTION

Figure 1:
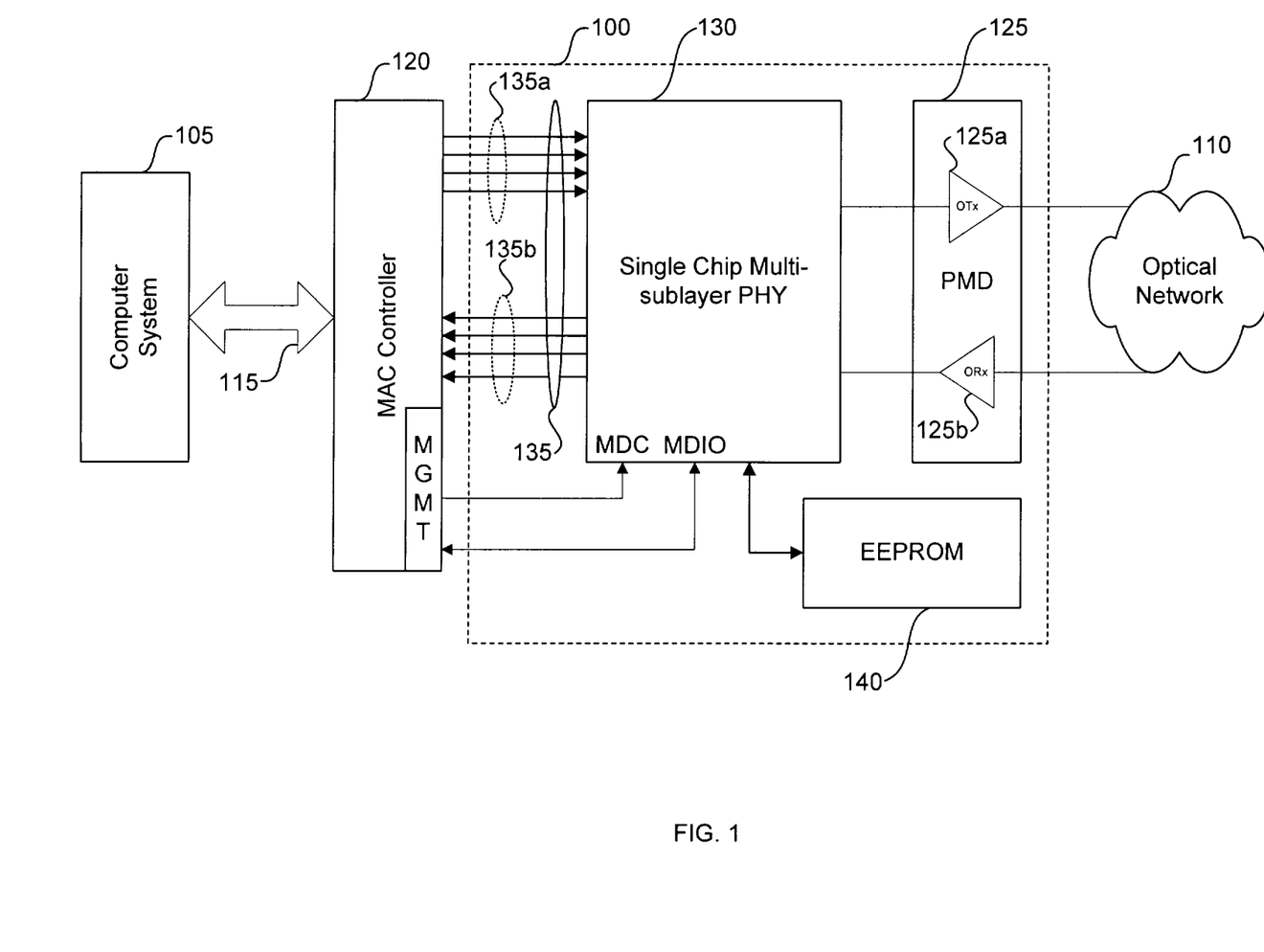
FIG. 1 is a block diagram of an exemplary transceiver module in accordance with an embodiment of the present invention.

FIG. 1 is a block diagram of an exemplary transceiver module 100 in accordance with one aspect of the invention. Referring to FIG. 1, there is also illustrated a computer system 105, a MAC controller 120, a MAC controller interface 115, an optical network 110, a single-chip multimode multi-sublayer PHY device 130, an electrically erasable programmable read only memory (EEPROM) 140, an optical transmitter 125a and optical receiver 125b. Transceiver module 100 may be an integrated device, which may include the single-chip multimode multi-sublayer PHY device 130, the EEPROM 140, the optical transmitter 125a and the optical receiver 125b. Computer system 105 may interface with MAC controller 120 through the medium access controller interface 115 and may communicate with the optical network 110 through the transceiver module 100.

Transceiver module 100 may be configured to communicate, namely transmit and receive, data between a computer system 105 and an optical network 110. The data transmitted and/or received may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1 provides services to layer 2 and layer 2 provides services to layer 3. The data link layer, layer 2, may include a medium access control (MAC) layer whose functionality may be handled by a MAC controller 120. MAC controller 120 may be interfaced to computer system 105 via the MAC interface 115. In this regard, MAC controller 120 may be configured to implement the well-known IEEE 802.3ae Gigabit Ethernet protocol.

In the arrangements of FIG. 1, the computer system 105 may represent the layer 3 and above, the MAC controller 120 may represent layer 2 and above and the transceiver module 100 may represent layer 1. The computer system 105 may be configured to build the five highest functional layers for data packets that are to be transmitted over the optical network 110. Since each layer in the OSI model may provide a service to the immediately higher interfacing layer, the MAC controller 120 may provide the necessary services to the computer system 105 to ensure that packets are suitably formatted and communicated to the transceiver module 100. During transmission, each layer may add its own header to the data passed on from the interfacing layer above it. However, during reception, a compatible device having a similar OSI stack may strip off the headers as the message passes from the lower layers up to the higher layers.

The transceiver module 100 may be configured to handle all the physical layer requirements, which may include, but is not limited to, packetization, serialization/deserialization (SERDES) and data transfer. Transceiver module 100 may operate at a plurality of data rates, which may include 10 Gbps. Data packets received by the transceiver module 100 from MAC controller 120 may include data and header information for each of the above six functional layers. The transceiver module 100 may be configured to encode data packets that are to be transmitted over the optical medium of the optical network 110. The transceiver module 100 may also be configured to decode data packets received from the optical network 110.

The MAC controller 120 interfaces with the single-chip multimode multi-sublayer PHY 130 of the transceiver module 100 through a 10 Gbps Ethernet attachment unit interface (XAUI) 135. The XAUI is a low pin count device having a self-clocked bus, which directly evolved from lower data rate protocols. The XAUI may function as an extender interface for a 10 Gigabit media independent interface (XMGII). The XAUI may utilize a plurality of serial data lanes on each of its receive 135a and transmit 135b sections to achieve compatible 10 GbE operational speeds. Notably, the XAUI may be arranged as two, 4-bit interfaces, each with four serial lines, thereby achieving about 10 Gbps throughput. In accordance with the embodiments of FIG. 1, XAUI 135a may be configured to transmit data from the MAC controller 120 to the single-chip multimode multi-sublayer PHY 130. Additionally, XAUI 135b may be configured to transmit data from the single-chip multimode multi-sublayer PHY 130 to the MAC controller 120.

The single-chip multimode multi-sublayer PHY 130 may support multiple modes of operation. In this regard, the single-chip multimode multi-sublayer PHY 130 may be configured to operate in one or more of a plurality of communication modes. Each communication mode may implement a different protocol. These communication modes may include, but are not limited to, 10 GbE, fibre channel and other similar protocols. The single-chip multimode multi-sublayer PHY 130 may be configured to operate in a particular mode of operation upon initialization or during operation.

The single-chip multimode multi-sublayer PHY 130 may also include a fully integrated serialization/deserialization device, which may be configured to operate at speeds of 10 Gbps. During transmission, the single-chip multimode multi-sublayer PHY 130 may serialize the data received over the 4-bit XAUI 135a and transmits the data as a single 10 Gbps stream to the optical PMD 125a. During reception, the single-chip multimode multi-sublayer PHY 130 may deserialize a single 10 Gbps signal from the optical PMD 125 and transmit the data as, for example, a 4-bits x 3.125 Gbps datastream over XAUI 135b.

The optical PMD 125 may include at least one transmit optical PMD 125a and at least one receive optical PMD 125b. In operation, optical PMD 125 may receive data from and transmit data to the optical network 110. The optical transmitter 125a may transmit data originating from the computer system 105 over the optical network 110. The optical receiver 125b may receive data destined for computer system 105 from the optical network 110 and transmit the data to the computer system 105. The optical PMD 125 may also be configured to function as an electro-optical interface. In this regard, electrical signals may be received by optical transmitter 125a and transmitted as optical signals over the optical networks 110. Additionally, optical signals may be received by optical receiver 125b and transmitted as electrical signals to the computer system 105.

The transceiver module 100 may also include EEPROM 140. EEPROM such as EEPROM 140 are well known in the art. EEPROM 140 may be programmed with information including parameters and/or code that may effectuate the operation of the single-chip multimode multi-sublayer PHY 130. The parameters may include configuration data and the code may include operational code such as firmware, although it should be recognized that the information is not limited in this regard.

Figure 2:
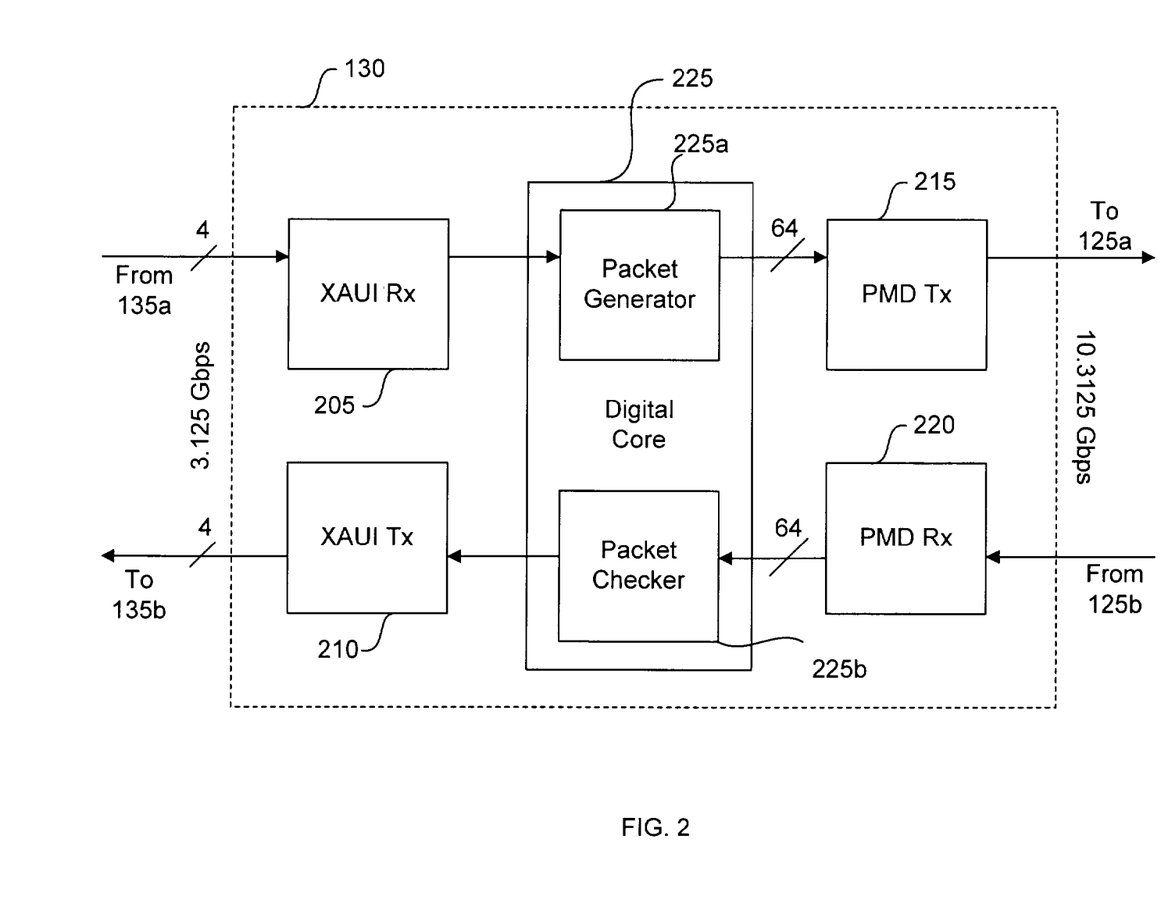
FIG. 2 is a block diagram of an exemplary single-chip multimode multi-sublayer PHY used in the transceiver module of FIG. 1 in accordance with an embodiment of the present invention.

Referring now to FIG. 2, there is illustrated a block diagram of an exemplary single-chip multimode multi-sublayer PHY 130, in accordance the present invention. The single-chip multimode multi-sublayer PHY 130 may include a XAUI receiver 205, a XAUI transmitter 210, a PMD transmitter 215, and a PMD receiver 220 for receiving and transmitting data. The single-chip multimode multi-sublayer PHY 130 may further include a digital core 225 for serializing and deserializing (SERDES) received data. The digital core 225 may include a packet generator 225a and a packet checker 225b.

In operation, data from the XAUI 135a may be received at XAUI receiver 205, serialized by the digital core 225, and transmitted as a single 10 Gbps datastream by the PMD transmitter 215. This may be considered the transmit path. Data from the optical PMD receiver 125b may be received at PMD receiver 220, deserialized by the digital core 225, and transmitted as, for example, 4-bit×3.125 Gbps streams by the XAUI receiver 210. This may be considered the receive path.

The packet generator 225a and the packet checker 225b may be configured to execute a built-in self testing (BIST) for the single-chip multimode multi-sublayer PHY 130. In operation, the packet generator 225a may generate test packets that may be transmitted to a device under test. The test packets may then be received by the packet checker 225b from the device under test. The packet checker 225b may maintain a copy of the test packets, known as the expected packets. The packet checker 225b may compare the test packets received from the device under test to the expected packets. The device under test may be defective or malfunctioning if a comparison shows that the received test packets are inconsistent with the expected packets. The single-chip multimode multi-sublayer PHY 130 may be configured to support BIST in two different modes. Namely, an optical link testing mode and electrical interface testing mode.

Figure 3:
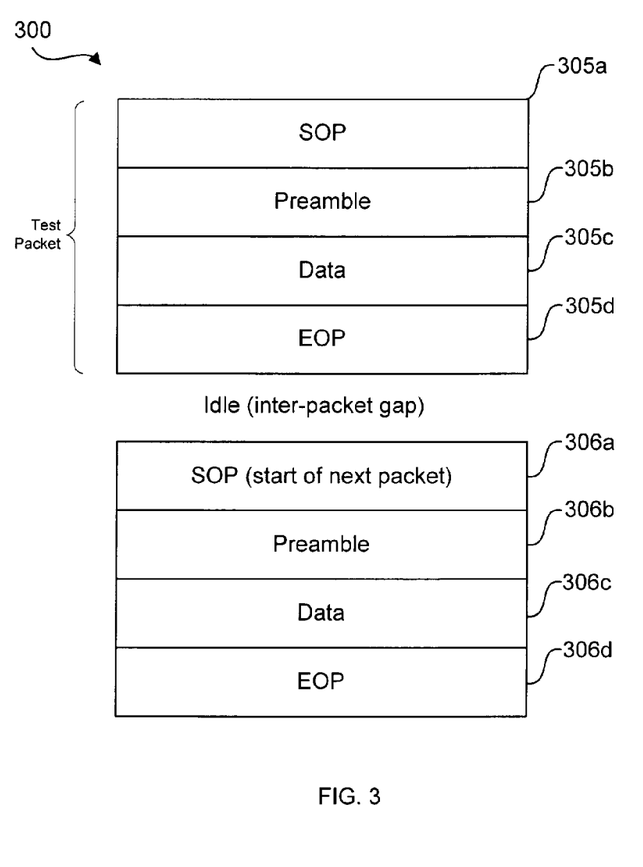
FIG. 3 is a block diagram of an exemplary test packet stream generated by the single-chip multimode multi-sublayer PHY of FIG. 2 in accordance with an embodiment of the present invention.

Referring now to FIG. 3, there is illustrated a block diagram describing an exemplary test packet stream 300 which may be generated by the packet generator 225a, in accordance with one embodiment of the present invention. The test packet stream 300 may include any number of test packets 305 and inter-packet gaps 310 inserted between the test packets 305. The test packets 305 include a start of packet sequence 305a, followed by a header 305b, a data portion 305c, and an end of packet sequence 305d. However, the invention is not limited in this regard.

Figure 4:
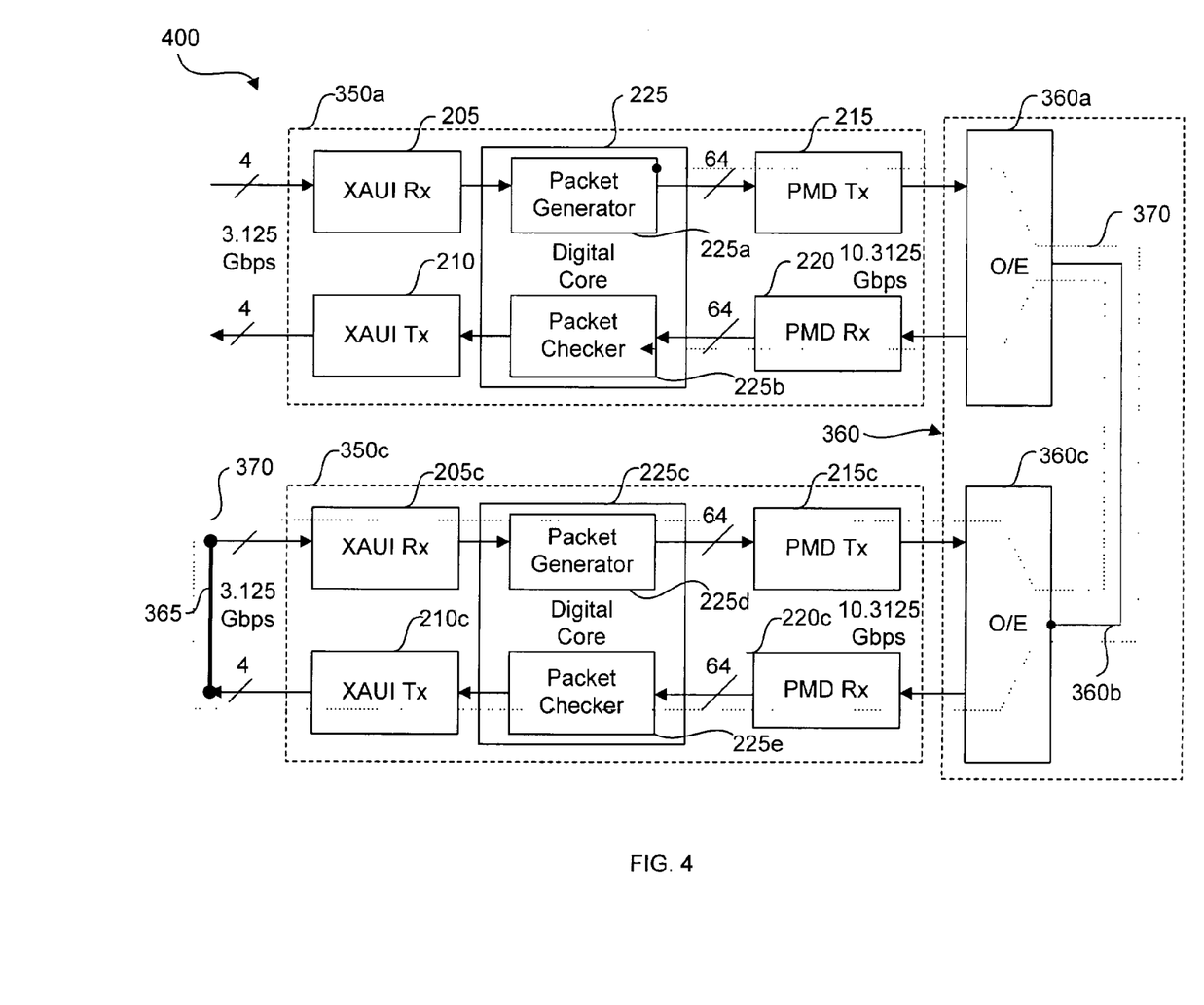
FIG. 4 is a block diagram of an exemplary configuration for optical link testing of a device under test using the single-chip multimode multi-sublayer PHY of FIG. 2 in accordance with an embodiment of the present invention.

FIG. 4 is a block diagram 400 of an exemplary configuration for optical link testing of a device under test using the single-chip multimode multi-sublayer PHY in accordance with the embodiments of FIG. 2. Referring now to FIG. 4, there is illustrated a block diagram of a verified or golden test chip 350a configured for testing a device under test 350c using the optical link testing mode, in accordance with one embodiment of the present invention. The verified test chip 350a may include a single-chip multimode multi-sublayer PHY whose operation without defect has been thoroughly verified. The operation of the verified test chip 350a may be verified by intense testing, including both internal and external testing by various test equipment. The time and cost of verifying the operation of a verified test chip 350a is often justifiable because very few verified test chips 350a may be used to simply and quickly test a large number of devices under test 355.

Alternatively, a verified test chip 350a may be a previous device under test, which passed a test without error and has been classified as being operational. The device under test 350c may include a single-chip multimode multi-sublayer PHY. The device under test 350c may have, but does not require, the BIST functionality. In this regard, the packet generator 225d and packet checker 225e are not critical to the embodiments of FIG. 4. Alternatively, it should be recognized the devices 255d and 255e may be disabled. When devices 255d and 255e may be disabled, then signals may merely pass through these devices unaltered or the devices may be bypassed. In another aspect of the invention, packet checker 225e may be adapted to provide further fault isolation. In this regard, packet checker 225e may be configured to distinguish between failures that may occur in any one or more of the device under test 350c, the electrical loopback 365 and the optical channel 360b.

The device under test 350c and the verified test chip 350a may be connected by an optical link 360. The optical link 360 may include a first electrical/optical interface 360a, an optical channel 360b, and a second electrical/optical interface 360c. The electrical/optical interfaces 360a, 360c may include, for example, optical PMDs. The optical channel 360b may include an optical fiber. The first electrical/optical interface 360a may be connected to the PMD transmitter 215 and the PMD receiver 220 of the verified test chip 350. The second electrical/optical interface 360c may be connected to the PMD transmitter 215c and the PMD receiver 220c of the device under test 350c. Additionally, the device under test 350c may include an electrical loopback 365 connecting the XAUI receiver 205 and the XAUI transmitter 210 in the device under test 355. The loopback may be achieved by, for example, a connection such as a bus or wire, or by configuring one or more registers in the device that permits operation in a loopback mode.

The configuration in FIG. 4 may establish a test path 370 originating from the packet generator 225a to the device under test 350c and finally to the packet checker 225b. The test path 370 may include the receive and transmit paths of the device under test 350c. The test path 370 may start at the verified test chip's packet generator 225 and may include, PMD transmitter 215, optical link 360, the device under test's PMD receiver 220c, digital core 225c, XAUI transmitter 210c, the electrical loop back 365, the XAUI receiver 205c, digital core 225c, PMD transmitter 215c, optical link 360, the verified test chip's PMD receiver 220, and finally end at the packet checker 225b. A defect within any module in the device under test 350c, may therefore be detected. Accordingly, a defect in any one or more of the PMD receiver 220c, digital core 225, XAUI transmitter 210c, XAUI receiver 205c, PMD transmitter 215c, will corrupt data sent by packet generator 225 and received by the packet checker 225b. Packet checker 225b when it compares a portion of or all of the received packets with the transmitted packets may detect the corrupted data.

Figure 5:
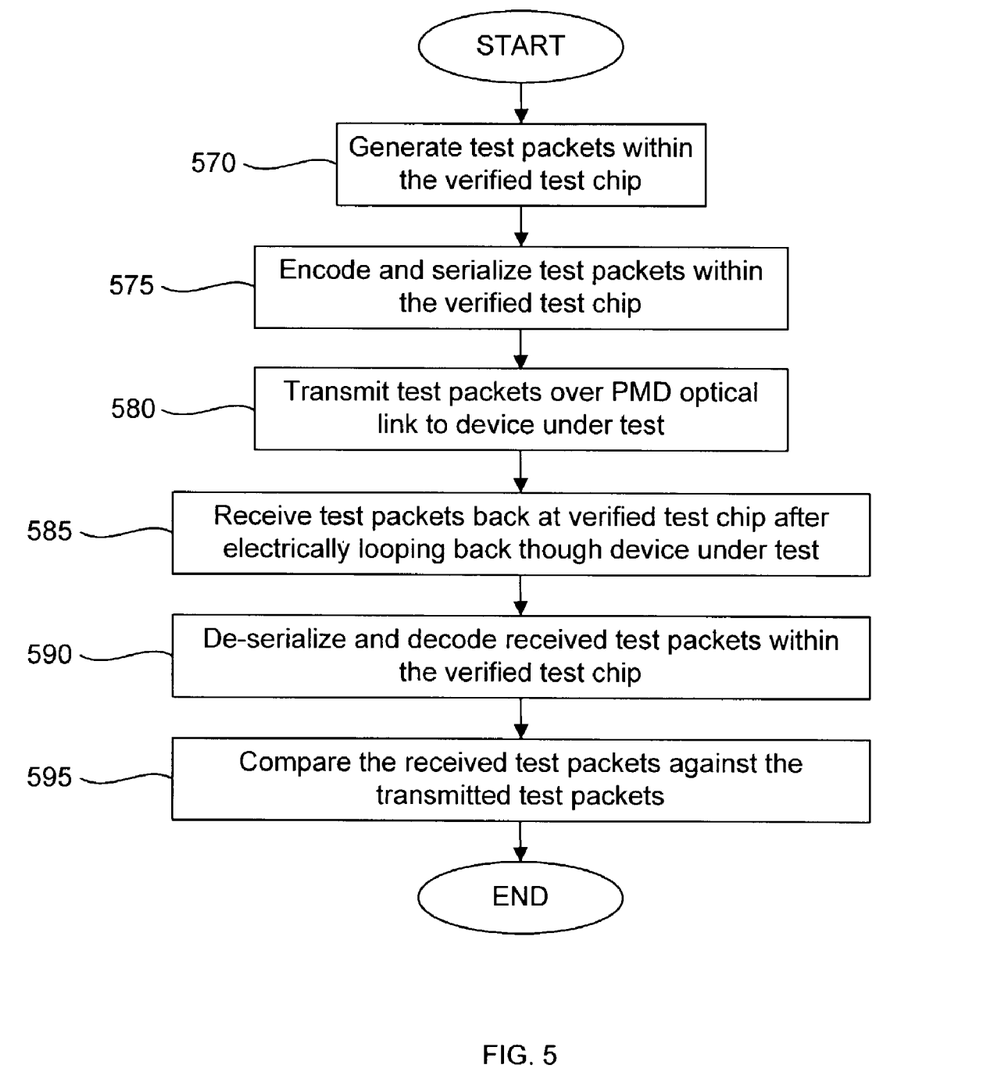
FIG. 5 is a flow diagram describing optical link testing in accordance with an embodiment of the present invention.

Referring now to FIG. 5, there is illustrated a flow diagram describing electrical interface testing of a device under test, in accordance with the embodiments of FIG. 4. Referring now to FIG. 5, in step 570, the packet generator 225a may generate test packets within the verified test chip 350a. In step 575, the test packets may be encoded and serialized by the digital core 225 within the verified test chip 350a. In step 580, the test packets may be transmitted over PMD transmitter 215 via the optical link 360 to the device under test 350c. The test packets transmitted to the device under test 350c may be transmitted along the receive path, which may include PMD receiver 220c, digital core 225c, and XAUI transmitter 210c, electrical loopback 365, the transmit path which may include XAUI receiver 205c, digital core 225c, and PMD transmitter 215c, and the optical link 360.

In step 585, the test packets may be received from the optical link 360 by the verified test chip 350. In step 590, the test packets may be de-serialized and decoded by the digital core 225. In step 595, the de-serialized and decoded test packets may be compared against the expected packet. If the test packets are inconsistent with the expected packets, the device under test 355 is defective.

Figure 6:
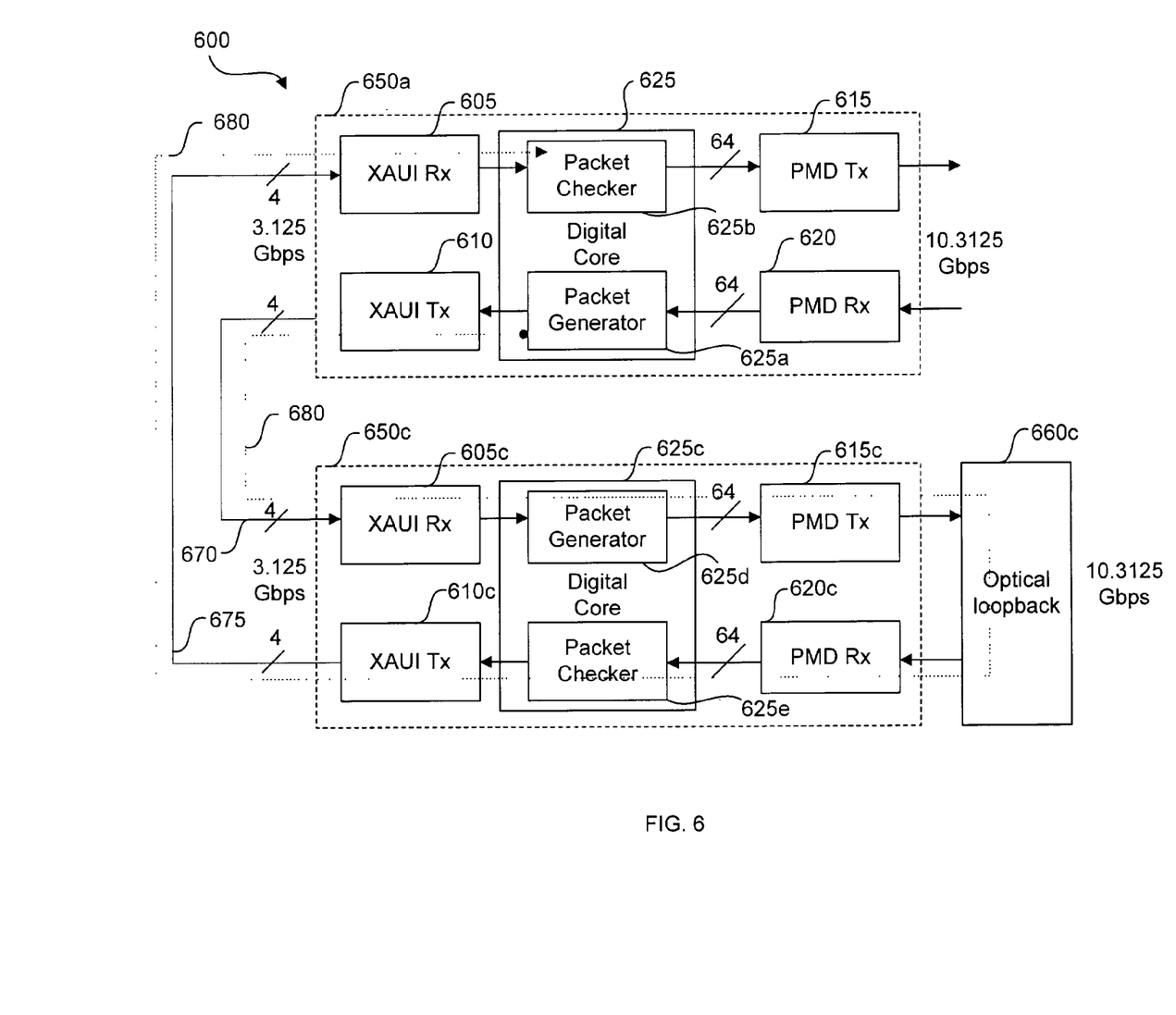
FIG. 6 is a block diagram of an exemplary configuration for electrical interface testing of a device under test using the single-chip multimode multi-sublayer PHY of FIG. 2 in accordance with an embodiment of the present invention.

FIG. 6 is a block diagram 600 of an exemplary configuration for electrical interface testing of a device under test using the single-chip multimode multi-sub-layer PHY in accordance with the embodiments of FIG. 2. Referring now to FIG. 6, there is illustrated a block diagram of a verified test chip 650a configured for testing a device under test 650c using the electrical interface testing mode, in accordance with one embodiment of the present invention. The device under test 650c and the verified test chip 650a may be connected by a first electrical interface 670 and a second electrical interface 675. The first electrical interface 670 may be connected to the XAUI transmitter 610 of the verified test chip 650a and the XAUI receiver 605c of the device under test 650c. The second electrical interface 675 may be connected to the XAUI transmitter 210c of the device under test 650c and the XAUI receiver 605 of the verified test chip 650. Additionally, the device under test 650c may include an optical loopback connection 660c, which may connect the PMD transmitter 615c and the PMD receiver 620c in the device under test 650c. The loopback may be achieved by, for example, a connection such as a bus or wire, or by configuring one or more registers in the device that permits operation in a loopback mode.

The foregoing configuration may establish a test path 680 originating from the packet generator 625a, through the device under test 650c and back to the packet checker 625b of the verified test chip 650a. The test path 680 may include the receive and transmit paths of the device under test 650c and is illustrated with dashed lines 680 for clarity. The test path 680 may include the verified test chip's packet generator 625a, XAUI transmitter 610, electrical interface 670, XAUI receiver 605c, digital core 625, PMD transmitter 615c, optical loopback 660c, the device under test's PMD receiver 620c, digital core 625c, XAUI transmitter 610c, electrical interface 680, XAUI receiver 605 and packet checker 625b. Accordingly, a defect lying in any of the modules in the device under test 650c, including XAUI receiver 605c, digital core 625c, PMD transmitter 615c, PMD receiver 620c and XAUI transmitter 610c may be detected.

A defect in any one or more of the, XAUI receiver 605c, digital core 625c, PMD transmitter 615c, PMD receiver 620c and XAUI transmitter 610c will corrupt data sent by packet generator 625a and received by the packet checker 625b. Packet checker 625b when it compares a portion of or all of the received packets with the transmitted packets may detect the corrupted data. The device under test may be configured to operate in either a 10 GbE or fibre channel mode during testing although the invention is not limited in this regard.

Figure 7:
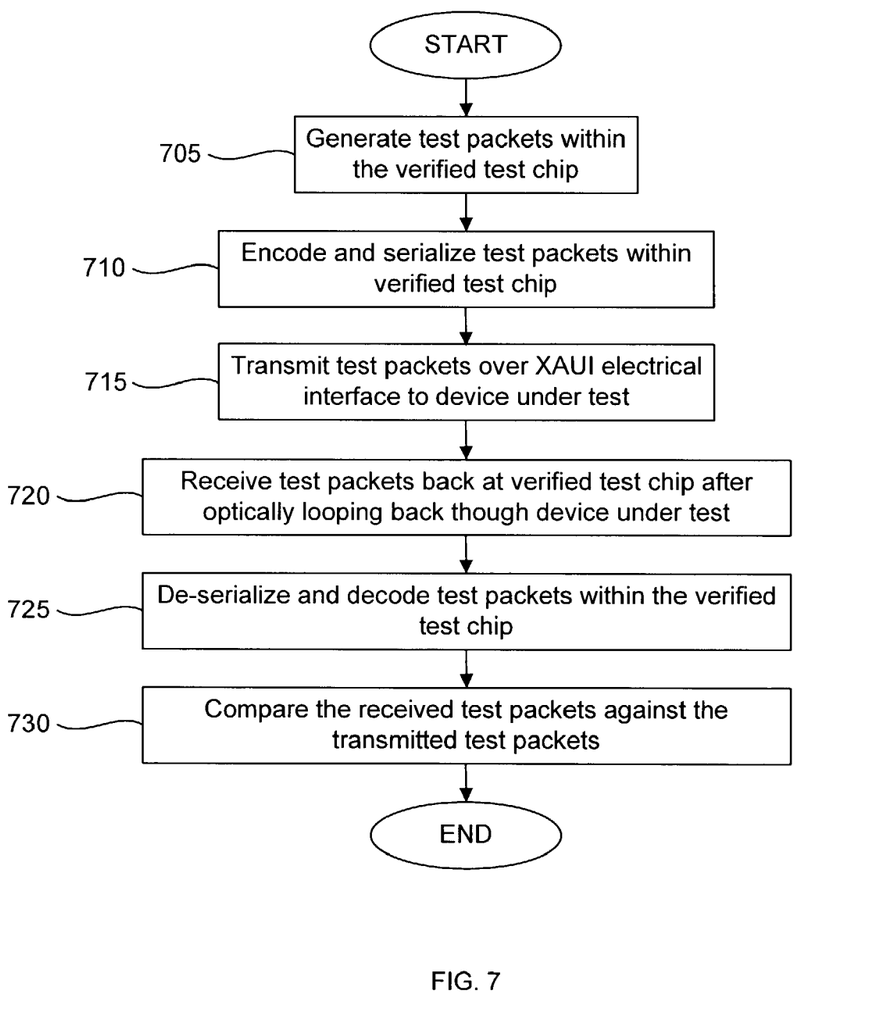
FIG. 7 is a flow diagram describing electrical interface testing in accordance with an embodiment of the present invention.

Referring now to FIG. 7, there is illustrated a flow diagram describing electrical interface testing of a device under test, in accordance with the embodiments of FIG. 6. In step 705, the packet generator 625a may generate test packets within the verified test chip 650a. In step 710, the test packets may be encoded and de-serialized by the digital core 625 within the verified test chip 650. In step 715, XAUI transmitter 610 may transmit the test packets over the electrical interface 670 to the device under test 650c. The test packets transmitted to the device under test 650c may be transmitted along the transmit path, which may include XAUI receiver 605c, digital core 625c, PMD transmitter 615c, optical loopback 660c, and the receive path which may include PMD receiver 620c, digital core 625c, XAUI transmitter 610c and electrical interface 675. In step 720, the test packets may be received from the electrical interface 675 by the verified test chip 500. In step 725, the test packets may be serialized and decoded by the digital core 625. In step 730, the serialized and decoded test packets may be compared against the expected packets. If the test packets are inconsistent with the expected packets, the device under test 650c is defective. The device under test may be configured to operate in either a 10 GbE or fibre channel mode although the invention is not limited in this regard.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for determining whether a physical layer device under test is defective, the method comprising:
    establishing a closed communication path between a verified physical layer device and the physical layer device under test via an optical interface of said verified physical layer device and an optical interface of the physical layer device under test;
    comprising configuring the physical layer device under test to operate in loopback mode;
    generating test packets from said verified physical layer device to be communicated over said established closed communication path;
    receiving at least a portion of said test packets at said verified physical layer device from the physical layer device under test communicated via said established closed communication path; and
    comparing at least a portion of said received test packets with at least a portion of said generated test packets, to determine whether the physical layer device under test is defective.

2. The method according to claim 1, wherein said establishing further comprises connecting an optical output of said verified physical layer device to an optical input of said physical layer device under test.

3. The method according to claim 2, wherein said connecting further comprises:
    connecting an optical transmit path of said verified physical layer device to an optical receive path of the physical layer device under test; and
    connecting an optical receive path of said verified physical layer device to an optical transmit path of the physical layer device under test.

4. The method according to claim 1, wherein said configuring further comprises connecting an electrical receive path of the physical layer device under test to an electrical transmit path of the physical layer device under test.

5. The method according to claim 1, wherein said generating step further comprises transmitting said generated test packets from said verified physical layer device over said closed communication path to the physical layer device under test.

6. The method according to claim 1, wherein said comparing step further comprises:
    identifying the physical layer device under test as defective if at least a selected portion of said received test packets are not equivalent to a corresponding selected portion of said generated test packets; and
    identifying the physical layer device under test as operational if at least a selected portion of said received test packets is equivalent to a corresponding selected portion of said generated test packets.

7. The method according to claim 1, further comprising initializing said verified physical layer device and said physical layer device under test to operate in a 10 Gigabit Ethernet mode.

8. The method according to claim 1, further comprising initializing said verified physical layer device and said physical layer device under test to operate in a fibre channel mode.

9. A method for determining whether a physical layer device under test is defective, the method comprising:
    establishing a closed communication path between a verified physical layer device and the physical layer device under test via an electrical interface of said verified physical layer device and an electrical interface of the physical layer device under test;
    configuring the physical layer device under test to operate in loopback mode;
    generating test packets from said verified physical layer device to be communicated over said established closed communication path;
    receiving at least a portion of said test packets at said verified physical layer device from the physical layer device under test communicated via said established closed communication path; and
    comparing at least a portion of said received test packets with at least a portion of said generated test packets, to determine whether the physical layer device under test is defective.

10. The method according to claim 9, wherein said establishing further comprises connecting an electrical output of said verified physical layer device to an electrical input of the physical layer device under test.

11. The method according to claim 10, wherein said connecting further comprises:
    connecting an electrical transmit path of said verified physical layer device to an electrical receive path of the physical layer device under test; and
    connecting an electrical receive path of said verified physical layer device to an electrical transmit path of the physical layer device under test.

12. The method according to claim 10, wherein said configuring further comprises connecting an optical receive path of the physical layer device under test to an optical transmit path of the physical layer device under test.

13. The method according to claim 9, wherein said generating further comprises transmitting said generated test packets from said verified physical layer device over said closed communication path to the physical layer device under test.

14. The method according to claim 9, wherein said comparing further comprises:
    identifying the physical layer device under test as defective if at least a selected portion of said received test packets are not equivalent to a corresponding selected portion of said generated test packets; and
    identifying the physical layer device under test as operational if at least a selected portion of said received test packets is equivalent to a corresponding selected portion of said generated test packets.

15. The method according to claim 9, further comprising initializing said verified physical layer device and the physical layer device under test to operate in a 10 Gigabit Ethernet mode.

16. The method according to claim 9, further comprising initializing said verified physical layer device and the physical layer device under test to operate in a fibre channel mode.

17. A system for determining whether a physical layer device under test is defective, the system comprising:
   means for establishing a closed communication path between a verified physical layer device and the physical layer device under test via an optical interface of said verified physical layer device and an optical interface of the physical layer device under test;
   means for configuring the physical layer device under test to operate in loopback mode;
   means for generating test packets from said verified physical layer device to be communicated over said established closed communication path;
   means for receiving at least a portion of said test packets at said verified physical layer device from the physical layer device under test communicated via said established closed communication path; and
   means for comparing at least a portion of said received test packets with at least a portion of said generated test packets, to determine whether the physical layer device under test is defective.

18. The system according to claim 17, wherein said establishing means further comprises means for connecting an optical output of said verified physical layer device to an optical input of the physical layer device under test.

19. The system according to claim 18, wherein said connecting means further comprises:
   means for connecting an optical transmit path of said verified physical layer device to an optical receive path of the physical layer device under test; and
   means for connecting an optical receive path of said verified physical layer device to an optical transmit path of the physical layer device under test.

20. The system according to claim 19, wherein said configuring means further comprises means for connecting an electrical receive path of the physical layer device under test to an electrical transmit path of the physical layer device under test.

21. The system according to claim 17, wherein said generating means further comprises means for transmitting said generated test packets from said verified physical layer device over said closed communication path to the physical layer device under test.

22. The system according to claim 17, wherein said comparing means further comprises:
   means for identifying the physical layer device under test as defective if at least a selected portion of said received test packets are not equivalent to a corresponding selected portion of said generated test packets; and
   means for identifying the physical layer device under test as operational if at least a selected portion of said received test packets is equivalent to a corresponding selected portion of said generated test packets.

23. The system according to claim 17, wherein said verified physical layer device and said physical layer device under test operates in a 10 Gigabit Ethernet mode.

24. The system according to claim 17, wherein said verified physical layer device and said physical layer device under test operates in a fibre channel mode.

25. A system for determining whether a physical layer device under test is defective, the system comprising:
   means for establishing a closed communication path between a verified physical layer device and the physical layer device under test via an electrical interface of said verified physical layer device and an electrical interface of the physical layer device under test;
   means for configuring the physical layer device under test to operate in loopback mode;
   means for generating test packets from said verified physical layer device to be communicated over said established closed communication path;
   means for receiving at least a portion of said test packets at said verified physical layer device from the physical layer device under test communicated via said established closed communication path; and
   means for comparing at least a portion of said received test packets with at least a portion of said generated test packets, to determine whether the physical layer device under test is defective.

26. The system according to claim 25, wherein said establishing means further comprises means for connecting an electrical output of said verified physical layer device to an electrical input of the physical layer device under test.

27. The system according to claim 26, wherein said connecting means further comprises:
   means for connecting an electrical transmit path of said verified physical layer device to an electrical receive path of the physical layer device under test; and
   means for connecting an electrical receive path of said verified physical layer device to an electrical transmit path of the physical layer device under test.

28. The system according to claim 25, wherein said configuring means further comprises means for connecting an optical receive path of the physical layer device under test to an optical transmit path of the physical layer device under test.

29. The system according to claim 25, wherein said generating means further comprises means for transmitting said generated test packets from said verified physical layer device over said closed communication path to the physical layer device under test.

30. The system according to claim 25, wherein said comparing means further comprises:
   means for identifying the physical layer device under test as defective if at least a selected portion of said received test packets are not equivalent to a corresponding selected portion of said generated test packets; and
   means for identifying the physical layer device under test as operational if at least a selected portion of said received test packets is equivalent to a corresponding selected portion of said generated test packets.

31. The system according to claim 25, wherein said verified physical layer device and said physical layer device under test operates in a 10 Gigabit Ethernet mode.

32. The system according to claim 25, wherein said verified physical layer device and said physical layer device under test operates in a fibre channel mode.

33. A system for determining whether a physical layer device under test is defective, the system comprising:
   a connector for establishing a closed communication path between a verified physical layer device and the physical layer device under test via an optical interface of said verified physical layer device and an optical interface of the physical layer device under test;
   a configuration device for configuring the physical layer device under test to operate in loopback mode;
   a packet generator for generating test packets from said verified physical layer device to be communicated over said established closed communication path;
   a receiver for receiving at least a portion of said test packets at said verified physical layer device from the physical layer device under test communicated via said established closed communication path; and a packet checker for comparing at least a portion of said received test packets with at least a portion of said generated test packets, to determine whether the physical layer device under test is defective.

34. The system according to claim 33, wherein said connector further comprises an output port for connecting an optical output of said verified physical layer device to an optical input port of the physical layer device under test.

35. The system according to claim 34, wherein said connector further comprises:
a connector for connecting an optical transmit path of said verified physical layer device to an optical receive path of the physical layer device under test; and
a connector for connecting an optical receive path of said verified physical layer device to an optical transmit path of the physical layer device under test.

36. The system according to claim 33, wherein said configuration device further comprises a connector for connecting an electrical receive path of the physical layer device under test to an electrical transmit path of the physical layer device under test.

37. The system according to claim 33, wherein said packet generator further comprises a transmitter for transmitting said generated test packets from said verified physical layer device over said closed communication path to the physical layer device under test.

38. The system according to claim 33, wherein said packet checker further comprises:
a processor for identifying the physical layer device under test as defective if at least a selected portion of said received test packets are not equivalent to a corresponding selected portion of said generated test packets; and
said processor for identifying the physical layer device under test as operational if at least a selected portion of said received test packets is equivalent to a corresponding selected portion of said generated test packets.

39. The system according to claim 33, wherein said verified physical layer device and said physical layer device under test operates in a 10 Gigabit Ethernet mode.

40. The system according to claim 33, wherein said verified physical layer device and said physical layer device under test operates in a fibre channel mode.

41. A system for determining whether a physical layer device under test is defective, the system comprising:
a connector for establishing a closed communication path between a verified physical layer device and the physical layer device under test via an electrical interface of said verified physical layer device and an electrical interface of the physical layer device under test;
a configuration device for configuring the physical layer device under test to operate in loopback mode;
a packet generator for generating test packets from said verified physical layer device to be communicated over said established closed communication path;
a receiver for receiving at least a portion of said test packets at said verified physical layer device from the physical layer device under test communicated via said established closed communication path; and
a packet checker for comparing at least a portion of said received test packets with at least a portion of said generated test packets, to determine whether the physical layer device under test is defective.

42. The system according to claim 41, wherein said connector further comprises an output port for connecting an electrical output of said verified physical layer device to an electrical input port of the physical layer device under test.

43. The system according to claim 42, wherein said connector further comprises:
a connecting device for connecting an electrical transmit path of said verified physical layer device to an electrical receive path of the physical layer device under test; and
a connecting device for connecting an electrical receive path of said verified physical layer device to an electrical transmit path of the physical layer device under test.

44. The system according to claim 41, wherein said configuration device further comprises a connector for connecting an optical receive path of the physical layer device under test to an optical transmit path of the physical layer device under test.

45. The system according to claim 41, wherein said packet generator further comprises a transmitter for transmitting said generated test packets from said verified physical layer device over said closed communication path to the physical layer device under test.

46. The system according to claim 41, wherein said packet checker further comprises:
a processor for identifying the physical layer device under test as defective if at least a selected portion of said received test packets are not equivalent to a corresponding selected portion of said generated test packets; and
said processor for identifying the physical layer device under test as operational if at least a selected portion of said received test packets is equivalent to a corresponding selected portion of said generated test packets.

47. The system according to claim 41, wherein said verified physical layer device and the physical layer device under test operates in a 10 Gigabit Ethernet mode.

48. The system according to claim 41, wherein said verified physical layer device and the physical layer device under test operates in a fibre channel mode.

* * * * *